US008393805B2

(12) United States Patent
Kosaka

(10) Patent No.: US 8,393,805 B2
(45) Date of Patent: Mar. 12, 2013

(54) IMAGE CAPTURING APPARATUS WITH IMPROVED CONTINUOUS SHOOTING SPEED

(75) Inventor: Takashi Kosaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 12/850,137

(22) Filed: Aug. 4, 2010

(65) Prior Publication Data

US 2011/0050952 A1    Mar. 3, 2011

(30) Foreign Application Priority Data

Aug. 27, 2009   (JP) ................................. 2009-197238

(51) Int. Cl.
| G03B 19/12 | (2006.01) |
| G03B 29/00 | (2006.01) |
| G03B 9/08 | (2006.01) |
| G03B 9/58 | (2006.01) |
| G03B 7/00 | (2006.01) |
| G02B 13/16 | (2006.01) |
| H04N 5/225 | (2006.01) |
| H04N 5/235 | (2006.01) |

(52) U.S. Cl. ........ 396/358; 396/354; 396/443; 396/452; 396/453; 396/478; 348/335; 348/341; 348/362

(58) Field of Classification Search ............. 348/207.99, 348/208.99, 208.4, 208.7–208.11, 335–341, 348/344, 362–369, 375; 396/354–358, 449–510, 396/401–402, 443

See application file for complete search history.

(56) References Cited

U.S. PATENT DOCUMENTS

| 5,025,276 | A | * | 6/1991 | Kitazawa et al. | ............. 396/358 |
| 7,344,321 | B2 | * | 3/2008 | Nakagawa | ..................... 396/443 |
| 7,384,204 | B2 | * | 6/2008 | Uematsu et al. | ............. 396/358 |
| 2004/0062540 | A1 | * | 4/2004 | Misawa | ......................... 396/387 |
| 2007/0253700 | A1 | * | 11/2007 | Okumura | ..................... 396/358 |
| 2008/0101788 | A1 | * | 5/2008 | Tomatsu | ....................... 396/358 |
| 2008/0175583 | A1 | * | 7/2008 | Seita | ............................. 396/357 |
| 2009/0028545 | A1 | * | 1/2009 | Sakai et al. | ................... 396/480 |
| 2010/0290775 | A1 | * | 11/2010 | Misawa | ....................... 396/358 |
| 2012/0141107 | A1 | * | 6/2012 | Inukai | .......................... 396/358 |

FOREIGN PATENT DOCUMENTS

JP        05-273637        10/1993

* cited by examiner

*Primary Examiner* — Roberto Velez
*Assistant Examiner* — Michael Osinski
(74) *Attorney, Agent, or Firm* — Cowan, Liebowitz & Latman, P.C.

(57) ABSTRACT

An image capturing apparatus includes a shutter spring which urges a shutter drive member for driving shutter blades, a shutter charge unit which is used to charge the shutter spring, and is switched between a fixed state in which a charge operation of the shutter spring is complete, and the shutter drive member is fixed and a released state, and a drive unit which drives the shutter charge unit. When a second determination unit determines that a switching ready state of a mirror from a mirror-down state to a mirror-up state is set when a first determination unit determines that a charge operation of the shutter spring is complete, the drive unit is controlled to drive the shutter charge unit to the released state without latch the shutter charge unit in the fixed state after the charge operation of the shutter spring is complete.

14 Claims, 6 Drawing Sheets

IMAGE CAPTURING APPARATUS WITH IMPROVED CONTINUOUS SHOOTING SPEED

BACKGROUND OF THE INVENTION

1. Field of the Invention

The present invention relates to an image capturing apparatus with an improved continuous shooting speed.

2. Description of the Related Arts

Conventionally, an image capturing apparatus that can execute continuous shooting operations has been proposed. Determining factors of a continuous shooting speed in a single-lens reflex camera include: a time required for mechanical operations of a mirror, shutter charge operation, and the like; and a time required for photometry and focus detection. In order to further speed up the continuous shooting operations, it is demanded to modify a control method of mechanical operations.

Japanese Patent Laid-Open No. 5-273637 describes that during driving of a wind-up motor used to feed frames of a film in the continuous shooting operation, driving of motors used for shooting preparation operations (mirror-up operation and stop drive operation) is started. According to Japanese Patent Laid-Open No. 5-273637, such an operation can improve the continuous shooting speed.

On the other hand, in order to improve the continuous shooting speed in terms of shutter operations, a shutter charge operation has to be speeded up. However, Japanese Patent Laid-Open No. 5-273637 does not describe any speeding-up method of the shutter charge operation.

SUMMARY OF THE INVENTION

The present invention improves, for example, a shooting speed in a continuous shooting in an image capturing apparatus.

According to an aspect of the present invention, there is provided an image capturing apparatus comprising: a shutter drive member which drives shutter blades; a shutter spring which urges the shutter drive member; a shutter charge unit adapted to charge the shutter spring, the shutter charge unit being switched between a fixed state in which a charge operation of the shutter spring is complete and the shutter drive member is fixed, and a released state in which the fixed state is released; a drive unit adapted to drive the shutter charge unit; a first determination unit adapted to determine whether or not the charge operation of the shutter spring is complete by driving of the shutter charge unit with the drive unit; a holding unit adapted to, when the shutter charge unit is switched to the released state, hold the shutter drive member in a same state as when the shutter spring is being charged; a mirror switched between a mirror-down state inserted in a shooting optical path and a mirror-up state retracted from the shooting optical path; a second determination unit adapted to determine whether or not the mirror is in a switching ready state in which the mirror can be switched from the mirror-down state to the mirror-up state; and a control unit adapted to, if the second determination unit determines that the mirror is in the switching ready state when the first determination unit determines that the charge operation of the shutter spring is complete, control the drive unit to drive the shutter charge unit to the released state without latch the shutter charge unit in the fixed state.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 1:
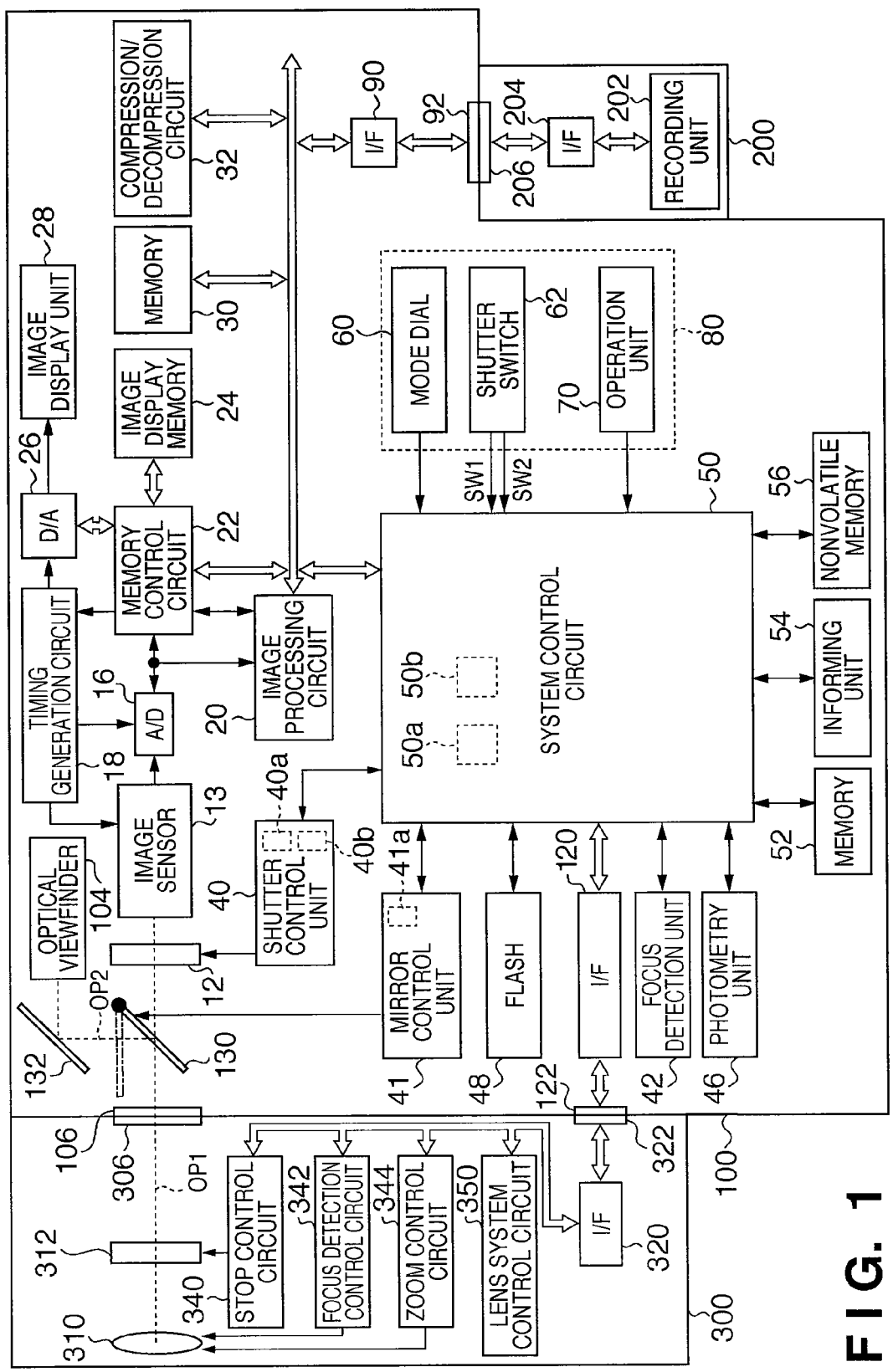
FIG. 1 is a block diagram showing an example of the arrangement of an image capturing apparatus according to the first embodiment of the present invention.

An image capturing apparatus 1 according to the first embodiment of the present invention will be described below using FIG. 1. The image capturing apparatus 1 includes a lens unit 300 and body 100.

The lens unit 300 is an interchangeable type lens unit. The lens unit 300 includes the following components.

A lens mount 306 mechanically couples the lens unit 300 to the body 100. The lens mount 306 includes various functions required to electrically connect the lens unit 300 to the body 100.

A lens 310 refracts incoming light to guide it to the body 100. The lens 310 includes a focus lens and zoom lens, which can be driven along a shooting optical path OP1 indicated by the broken line. A stop 312 adjusts an amount of light guided to the body 100 after the light passes through the lens 310.

An interface 320 connects the lens unit 300 to the body 100 in the lens mount 306. A connector 322 electrically connects the lens unit 300 to the body 100. The connector 322 also has a function of exchanging control signals, state signals, data signals, and the like between the body 100 and lens unit 300, and receiving or supplying currents of various voltages.

A stop control circuit 340 controls the stop 312 in cooperation with a shutter control unit 40, which controls a shutter 12, based on photometry information from a photometry unit 46 (to be described later) in the body 100.

A focus detection control circuit 342 controls focusing of the lens 310 by driving the focus lens. A zoom control circuit 344 controls zooming of the lens 310 by driving the zoom lens.

A lens system control circuit 350 systematically controls the respective units in the lens unit 300.

The lens unit 300 is mounted on the body 100. A recording medium 200 is detachably connected to the body 100. The body 100 includes the following components.

The shutter 12 controls exposure of an image sensor 13. Light rays, which enter the lens 310 in an open state of the shutter 12, are guided by a single-lens reflex system to the image sensor 13 via the stop 312, the lens mount 306, a lens mount 106, and the shutter 12, and are formed as an image of an object on an imaging surface (pixel array) of the image sensor 13. At this time, a mirror 130 is set in a mirror-up state retracted from the shooting optical path OP1, as indicated by the one-dashed chain line.

The image sensor 13 generates an image signal by photoelectrically converting an image of an object formed on the imaging surface (pixel array). The image sensor 13 reads out that image signal from the pixel array, and outputs the readout image signal.

An A/D converter 16 converts the image signal (analog signal) output from the image sensor 13 into image data (digital signal). The A/D converter 16 outputs the converted image data (digital signal).

A timing generation circuit 18 is controlled by a memory control circuit 22 and system control circuit 50, and supplies clock signals and control signals to the image sensor 13, the A/D converter 16, and a D/A converter 26 under the control of these circuits.

An image processing circuit 20 applies predetermined pixel interpolation processing and color conversion processing to image data output from the A/D converter 16 or that output from the memory control circuit 22. The image processing circuit 20 outputs the processed image data.

The memory control circuit 22 controls the A/D converter 16, the timing generation circuit 18, the image processing circuit 20, an image display memory 24, the D/A converter 26, a memory 30, and a compression/decompression circuit 32. Image data output from the A/D converter 16 is written in the image display memory 24 or memory 30 via the image processing circuit 20 and memory control circuit 22 or directly via the memory control circuit 22.

The image display memory 24 temporarily stores image data to be displayed on an image display unit 28. The D/A converter 26 accesses the image display memory 24 via the memory control circuit 22 to acquire image data to be displayed. The D/A converter 26 converts the image data to be displayed into a display image signal (analog signal), and supplies the converted image signal to the image display unit 28. The image display unit 28 displays an image according to the display image signal. The image display unit 28 includes, for example, a TFT-LCD.

The memory 30 temporarily stores (records) image data of a shot still picture. The memory 30 is also used as a work area of the system control circuit 50.

The compression/decompression circuit 32 compresses or decompresses image data by, for example, adaptive discrete cosine transformation (ADCT) processing. The compression/decompression circuit 32 executes compression or decompression processing by loading image data stored (recorded) in the memory 30, and writes (records) the processed image data in the memory 30.

The shutter control unit 40 controls the shutter 12 in cooperation with the stop control circuit 340, which controls the stop 312, based on photometry information from the photometry unit 46. The shutter control unit 40 controls a shutter drive motor 40b. The shutter drive motor 40b operates to charge the shutter 12, and to switch between a fixed state in which the shutter 12 is fixed and a released state in which the fixed state of the shutter 12 is released.

A mirror control unit 41 drives the mirror 130 to a mirror-up position (indicated by the one-dashed chain line) or mirror-down position (indicated by the solid line) via a mirror drive mechanism (not shown). The mirror control unit 41 includes a mirror drive motor 41a. The mirror drive motor 41a operates to switch between a mirror-up state in which the mirror 130 is retracted from the shooting optical path OP1 that leads to the image sensor 13, and a mirror-down state in which the mirror 130 is inserted into that shooting optical path OP1.

A focus detection unit 42 executes AF processing (automatic focus detection processing). The focus detection unit 42 receives light rays, which enter the lens 310, via the stop 312, the lens mounts 306 and 106, the mirror 130, and a focus detection sub-mirror (not shown) by the single-lens reflex system, and detects an in-focus state of an image formed as an optical image. The focus detection unit 42 supplies the detection result to the system control circuit 50.

The photometry unit 46 executes AE processing (automatic exposure processing). The photometry unit 46 receives light rays, which enter the lens 310, via the stop 312, the lens mounts 306 and 106, the mirror 130, a mirror 132, and a photometry lens (not shown) by the single-lens reflex system, and detects an exposure state of an image formed as an optical image. The photometry unit 46 supplies the detection result to the system control circuit 50. Also, the photometry unit 46 executes EF processing (pre-emission processing) in cooperation with a flash 48. The photometry unit 46 supplies the processing result to the system control circuit 50.

The flash 48 also has an AF auxiliary light projection function, and a flash light control function. The flash 48 receives an instruction from the system control circuit 50, and emits light at a predetermined timing in accordance with that instruction.

The system control circuit 50 systematically controls the respective units of the body 100. The system control circuit 50 includes a determination unit 50a and control unit 50b. The determination unit 50a determines whether or not a switching ready state by the mirror drive motor 41a from the mirror-down state to the mirror-up state is set. The control unit 50b controls the operation of the shutter drive motor 40b according to the determination result of the determination unit 50a. Detailed operations of the determination unit 50a and control unit 50b will be described later. A memory 52 stores constants, variables, programs, and the like required for operations of the system control circuit 50.

An informing unit 54 includes a liquid crystal display device and loudspeaker, which are used to inform operation states, messages, and the like using characters, images, sounds, and the like in accordance with execution of programs by the system control circuit 50. The informing unit 54 includes a combination of, for example, an LCD, LEDs, and tone generation element, which are arranged at one or a plurality of easy-to-see positions around an operation unit of the body 100. Some functions of the informing unit 54 are arranged inside an optical viewfinder 104. Of the display contents of the informing unit 54, those to be displayed on, for example, the LCD include, for example, a single shooting/continuous shooting indication, remaining shot count indication, shutter speed indication, aperture value indication, exposure correction indication, light control correction indication, and battery remaining amount indication.

Of the display contents of the informing unit 54, those to be displayed in the optical viewfinder 104 include, for example, an in-focus indication, flash charging completion indication, shutter speed indication, aperture value indication, and exposure correction indication. Furthermore, of the display contents of the informing unit 54, those to be indicated by, for example, the LEDs include, for example, a recording medium write access indication. Of the display contents of the informing unit 54, those to be displayed by, for example, a lamp include, for example, a self-timer notification lamp.

A nonvolatile memory 56 is an electrically erasable/recordable memory. The nonvolatile memory 56 includes, for example, an EEPROM.

An input unit 80 accepts various operation instructions of the system control circuit 50 from the user. The input unit 80 includes one or a plurality of combinations of switches and a dial. The input unit 80 includes a mode dial 60, shutter switch 62, and operation unit 70.

The mode dial 60 accepts instructions required to designate a plurality of shooting modes including a normal shooting mode and continuous shooting mode. Upon accepting an instruction required to designate the continuous shooting mode, the mode dial 60 supplies that instruction to the system control circuit 50.

The shutter switch 62 accepts different instructions depending on whether the shutter switch 62 is operated to a first or second stroke position. When the shutter switch 62 is operated to a first stroke position (for example, a half pressing position), it accepts a first instruction. Upon accepting the first instruction, the shutter switch 62 turns on a first switch SW1. That is, the shutter switch 62 supplies an operation start instruction of, for example, the AF processing, AE processing, and EF processing to the system control circuit 50 in response to the first instruction.

When the shutter switch 62 is operated to a second stroke position (for example, a full pressing position), it accepts a second instruction. Upon accepting the second instruction, the shutter switch 62 turns on a second switch SW2. That is, the shutter switch 62 supplies an operation start instruction of shooting processing including a series of exposure processing, developing processing, and recording processing to the system control circuit 50 in response to the second instruction. Note that the exposure processing is processing for writing a signal read out from the image sensor 13 in the memory 30 as image data via the A/D converter 16 and memory control circuit 22. The developing processing is processing using calculations in the image processing circuit 20 and memory control circuit 22. The recording processing is processing for reading out image data from the memory 30, compressing the readout image data by the compression/decompression circuit 32, and writing the compressed image data in the recording medium 200.

The operation unit 70 includes various buttons and the like. The operation unit 70 includes, for example, a menu button, set button, single shooting/continuous shooting/self-timer switching button, shooting image quality select button, ISO speed select button, exposure correction button, and light control correction button. Furthermore, the operation unit 70 includes, for example, a play switch, a white balance setting switch used to select a white balance mode, and a dial used to select various settings.

An interface 120 is used to connect the body 100 to the lens unit 300 in the lens mount 106. A connector 122 electrically connects the body 100 to the lens unit 300. The connector 122 also has a function of exchanging control signals, state signals, and data signals between the body 100 and lens unit 300, and supplying currents of various voltages.

The mirror 132 guides light rays, which enter the lens 310 and are reflected by the mirror 130, to the optical viewfinder 104 by the single-lens reflex system by further reflecting the light rays. An optical path OP2 of these light rays is split from the optical path OP1 that leads to the image sensor 13 at the position of the reflecting surface of the mirror 130. Note that the mirror 132 may adopt either an arrangement of a quick return mirror or half mirror.

The recording medium 200 includes, for example, a memory card and hard disk. The recording medium 200 includes a recording unit 202, interface 204, and connector 206. The recording unit 202 includes a semiconductor memory and magnetic disk. The interface 204 is that with the body 100. The connector 206 is used to connect the body 100.

Figure 2A:
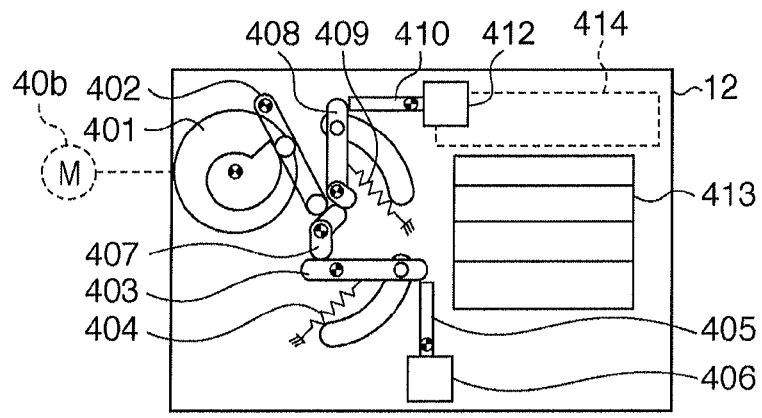
FIGS. 2A to 2C are views showing an example of the arrangement of a shutter charge mechanism of the image capturing apparatus according to the first embodiment of the present invention.
Figure 2B:
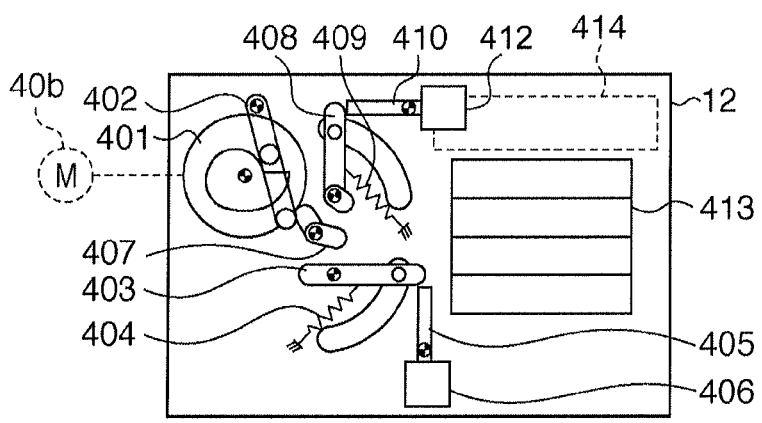
Figure 2C:
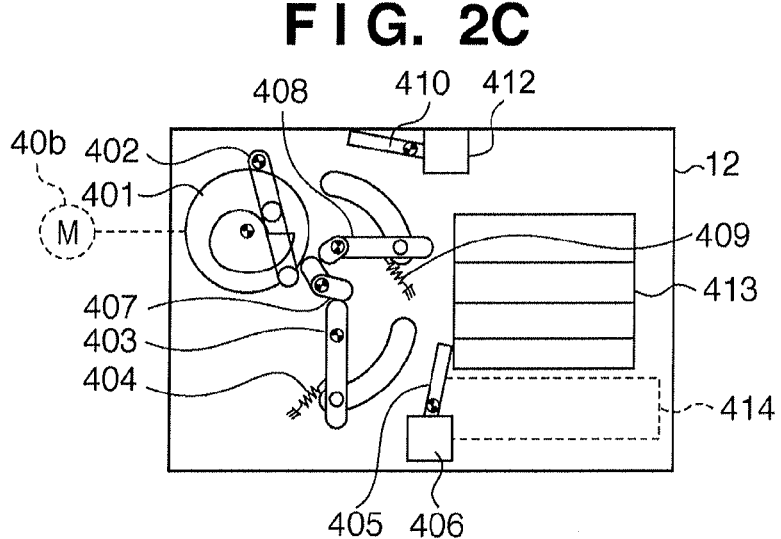

The detailed arrangement of the shutter 12 will be described below using FIGS. 2A to 2C. Referring to FIGS. 2A to 2C, reference numeral 401 denotes a cam gear, which is used to charge the shutter, and is driven by the shutter drive motor 40b. Reference numeral 402 denotes a charge lever that forms a cam follower that traces a cam formed on the cam gear 401. Reference numeral 413 denotes a shutter leading blade group that closes a shutter opening before exposure, and forms shutter blades. Reference numeral 403 denotes a shutter leading blade drive lever as a shutter drive member, which engages with the shutter leading blade group 413 to drive it. Reference numeral 404 denotes a shutter leading blade drive spring. When the shutter leading blade drive spring 404 urges the shutter leading blade drive lever 403, the shutter leading blade group 413 is driven. Reference numeral 405 denotes a shutter leading blade latch lever. The shutter leading blade latch lever 405 holds the shutter leading blade drive lever 403 at a travel prepared position. Reference numeral 406 denotes a shutter leading blade latch drive member which drives the shutter leading blade latch lever 405 to make the shutter leading blade group 413 travel.

Reference numeral 414 denotes a shutter trailing blade group which closes the shutter opening after exposure, and forms the shutter blades. Reference numeral 408 denotes a shutter trailing blade drive lever as a shutter drive member, which engages with the shutter trailing blade group 414 to drive it. Reference numeral 409 denotes a shutter trailing blade drive spring. When the shutter trailing blade drive spring 409 urges the shutter trailing blade drive lever 408, the shutter trailing blade group 414 is driven. Reference numeral 410 denotes a shutter trailing blade latch lever. The shutter trailing blade latch lever 410 holds the shutter trailing blade drive lever 408 at a travel prepared position. Reference numeral 412 denotes a shutter trailing blade latch drive member which drives the shutter trailing blade latch lever 410 to make the shutter trailing blade group 414 travel. Reference numeral 407 denotes a cam lever which is used to charge the shutter leading blade drive lever 402 and shutter trailing blade drive lever 408, and is driven by the shutter drive motor 40b. In the above arrangement, the cam gear 401, charge lever 402, and cam lever 407 form a shutter charge unit. The shutter leading blade latch lever 405, shutter leading blade latch drive member 406, shutter trailing blade latch lever 410, and shutter trailing blade latch drive member 412 form a latch unit.

FIG. 2A shows a fixed state. In the fixed state, a charge operation of the shutter 12 is complete, and the shutter leading blade drive lever 403 and shutter trailing blade drive lever 408 are fixed by the shutter charge unit including the cam gear 401, charge lever 402, and cam lever 407. FIG. 2B shows a released state. In the released state, the cam lever 407 and shutter leading blade drive lever 403 are disengaged, and the cam lever 407 and the shutter trailing blade drive lever 408 are disengaged. In this released state, the fixed state of the shutter leading blade drive lever 403 and shutter trailing blade drive lever 408 by the shutter charge unit is released. This released state corresponds to a travel prepared state of the shutter 12, since the shutter leading blade latch drive member 406 and shutter trailing blade latch drive member 412 hold the shutter leading blade drive lever 403 and shutter trailing blade drive lever 408. FIG. 2C shows a travel completed state (exposure completed state). In the travel completed state, since the stopped state of the shutter leading blade drive lever 403 is released by the shutter leading blade latch drive member 406, and the stopped state of the shutter trailing blade drive lever 408 is released by the shutter trailing blade latch drive member 412, the shutter leading blade group 413 and shutter trailing blade group 414 traveled.

The charge lever 402 switches between a first state in which it applies a pressing force to the cam lever 407 and a second state in which it does not apply any pressing force to the cam lever 407, according to the rotation position of the cam gear 401. The cam lever 407 abuts against the shutter leading blade drive lever 403 and shutter trailing blade drive lever 408 in the first state to fix these levers. The cam lever 407 does not abut against the shutter leading blade drive lever 403 and shutter trailing blade drive lever 408 in the second state. Therefore, the fixed state of the shutter leading blade drive lever 403 and shutter trailing blade drive lever 408 by the cam lever 407 is released. The cam lever 407 is set in the first state in the fixed state in FIG. 2A, and is set in the second state in the released state in FIG. 2B and the travel completed state in FIG. 2C.

In the released state in FIG. 2B, the shutter leading blade drive lever 403 is held at the travel prepared position by the shutter leading blade latch drive member 406, and the shutter trailing blade drive lever 408 is held at the travel prepared position by the shutter trailing blade latch drive member 412.

When the holding state by the shutter leading blade latch drive member 406 is released, the shutter leading blade drive lever 403 is driven to a travel completed position by the urging force of the shutter leading blade drive spring 404, and the shutter leading blade group 413 travels. Then, upon releasing the holding state by the shutter trailing blade latch drive member 412, the shutter trailing blade drive lever 408 is driven to the travel completed position by the urging force of the shutter trailing blade drive spring 409, and the shutter trailing blade group 414 travels. When the shutter leading blade group 413 and shutter trailing blade group 414 travel, the state shown in FIG. 2C is set.

The shutter leading blade latch lever 405 holds the shutter leading blade drive lever 403 at the travel prepared position until a predetermined timing is reached in the released state in FIG. 2B. Likewise, the shutter trailing blade latch lever 410 holds the shutter trailing blade drive lever 408 at the travel prepared position until a predetermined timing is reached in the released state in FIG. 2B.

The shutter leading blade latch drive member 406 drives the shutter leading blade latch lever 405 to release the holding state of the shutter leading blade latch lever 405 when the predetermined timing is reached, thereby making the shutter leading blade group 413 travel. Likewise, the shutter trailing blade latch drive member 412 drives the shutter trailing blade latch lever 410 to release the holding state of the shutter trailing blade latch lever 410, thereby making the shutter trailing blade group 414 travel.

In the fixed state in FIG. 2A, the shutter charge unit charges the shutter leading blade drive lever 403 and shutter trailing blade drive lever 408, and the shutter leading blade drive lever 403 and shutter trailing blade drive lever 408 are located at charge completed positions. At this time, when the charge lever 402 is lifted to a cam top position of the cam gear 401, the cam lever 407 is turned clockwise. When the cam lever 407 is driven, the shutter leading blade drive lever 403 and shutter trailing blade drive lever 408 are set in a charge completed state. At this time, the shutter leading blade latch lever 405 returns to a position where it can hold the shutter leading blade drive lever 403, and the shutter trailing blade latch lever 410 returns to a position where it can hold the shutter trailing blade drive lever 408. However, in the state in FIG. 2A, the shutter charge unit fixes the shutter leading blade drive lever 403 and shutter trailing blade drive lever 408 in the charge completed state. For this reason, the shutter leading blade latch lever 405 and shutter leading blade drive lever 403, and the shutter trailing blade latch lever 410 and shutter trailing blade drive lever 408 are not in contact with each other.

In the released state in FIG. 2B, the shutter leading blade group 413 and shutter trailing blade group 414 are set in the travel prepared state. In this state, the fixed state of the shutter leading blade drive lever 403 and shutter trailing blade drive lever 408 by the cam lever 407 is released. In this state, the shutter leading blade latch lever 405 holds the shutter leading blade drive lever 403, and the shutter trailing blade latch lever 410 holds the shutter trailing blade drive lever 408.

In the travel completed state in FIG. 2C, the shutter leading blade group 413 and shutter trailing blade group 414 traveled, and the exposure operation of the image sensor 13 is complete. In this state, the shutter leading blade latch lever 405 and shutter leading blade drive lever 403 are disengaged by the shutter leading blade latch drive member 406. After that, the shutter trailing blade latch lever 410 and shutter trailing blade drive lever 408 are disengaged by the shutter trailing blade latch drive member 412. Therefore, the shutter leading blade drive lever 403 is driven by the shutter leading blade drive spring 404, and the shutter trailing blade drive lever 408 is driven by the shutter trailing blade drive spring 409. As a result, the shutter leading blade group 413 and shutter trailing blade group 414 respectively travel.

The following sequence will be assumed in the continuous shooting mode. The shutter drive motor 40b used to charge the shutter is stopped in the fixed state in FIG. 2A. After that, the shutter drive motor 40b is operated again to drive the cam gear 401 from the fixed state in FIG. 2A to the released state in FIG. 2B, thus setting the shutter 12 in a travel prepared state. In this sequence, the shutter drive motor 40b is stopped without exception when the charge operation of the shutter 12 is completed, irrespective of whether or not a mirror-up operation and shooting operation are ready to be executed. Thus, it is difficult to improve the shooting speed in the continuous shooting mode.

Also, in this sequence, a frame interval is prolonged due to an increase of a time required for focus detection processing in the continuous shooting mode and a time required for display processing caused by a deficient image memory, and a shooting operation of the next frame is often temporarily disabled.

When the shutter is driven from the fixed state in FIG. 2A to the released state in FIG. 2B during a period in which the shooting operation of the next frame is temporarily disabled, if a shooting end instruction is accepted from the user, the shutter has to be re-charged to return from the released state in FIG. 2B to the fixed state in FIG. 2A. As a result, a fruitless charge operation is done. Alternatively, in this case, when the shutter leading blade group 413 and shutter trailing blade group 414 are left in the travel prepared state, the operation characteristic of the shutter leading blade group 413 or shutter trailing blade group 414 is likely to change due to vibrations or shocks or an elapse of a long term. When vibrations or shocks are large, the stopped state of the shutter leading blade drive lever 403 by the shutter leading blade latch lever 405 or of the shutter trailing blade drive lever 408 by the shutter trailing blade latch lever 410 is unwantedly released. This may case the shutter 12 to inadvertently travel.

When control is made to prevent any fruitless charge operation, the shooting end instruction from the user has to be ignored, and the continuous shooting operation has to be ended upon completion of a shooting operation of the next frame. In this case, the continuous shooting operation is not stopped although the shooting end instruction is issued, that is, a response is poor, thus posing another problem.

By contrast, this embodiment is configured to stop the shutter leading blade drive lever 403 and shutter trailing blade drive lever 408 to be set in a shutter charge completed state, as shown in FIG. 2A, except for during the shooting operation. Also, this embodiment is configured to drive to a shutter travel prepared state in which the fixed state of the shutter leading blade drive lever 403 and shutter trailing blade drive lever 408 by the shutter charge unit is released, as shown in FIG. 2B, and the latch unit holds the shutter leading blade drive lever 403 and shutter trailing blade drive lever 408, in response to an ON operation of the second switch SW2. Thus, the shutter leading blade group 413 and shutter trailing blade group 414 can be prevented from inadvertently traveling.

In the continuous shooting mode, after the travel completed state shown in FIG. 2C, the shutter drive motor 40b is temporarily stopped in the fixed state shown in FIG. 2A. After a mirror-up operation and shooting operation are then ready to be executed, the shutter drive motor 40b is driven to the released state shown in FIG. 2B, that is, the shutter travel prepared state in which the latch unit holds the shutter leading blade drive lever 403 and shutter trailing blade drive lever 408. After the travel completed state shown in FIG. 2C, upon completion of the charge operation of the shutter leading blade drive lever 403 and shutter trailing blade drive lever 408, if the mirror-up operation and shooting operation are ready to be executed, the shutter drive motor 40b is not stopped in the fixed state shown in FIG. 2A, but it is driven at once to the released state shown in FIG. 2B. In this manner, a time required to re-operate the shutter drive motor 40b so as to switch from the fixed state to the released state can be omitted. As a result, a time until the shutter is ready to travel so as to shoot the next frame after the current shooting operation can be shortened, thus improving the shooting speed in the continuous shooting mode.

Figure 3:
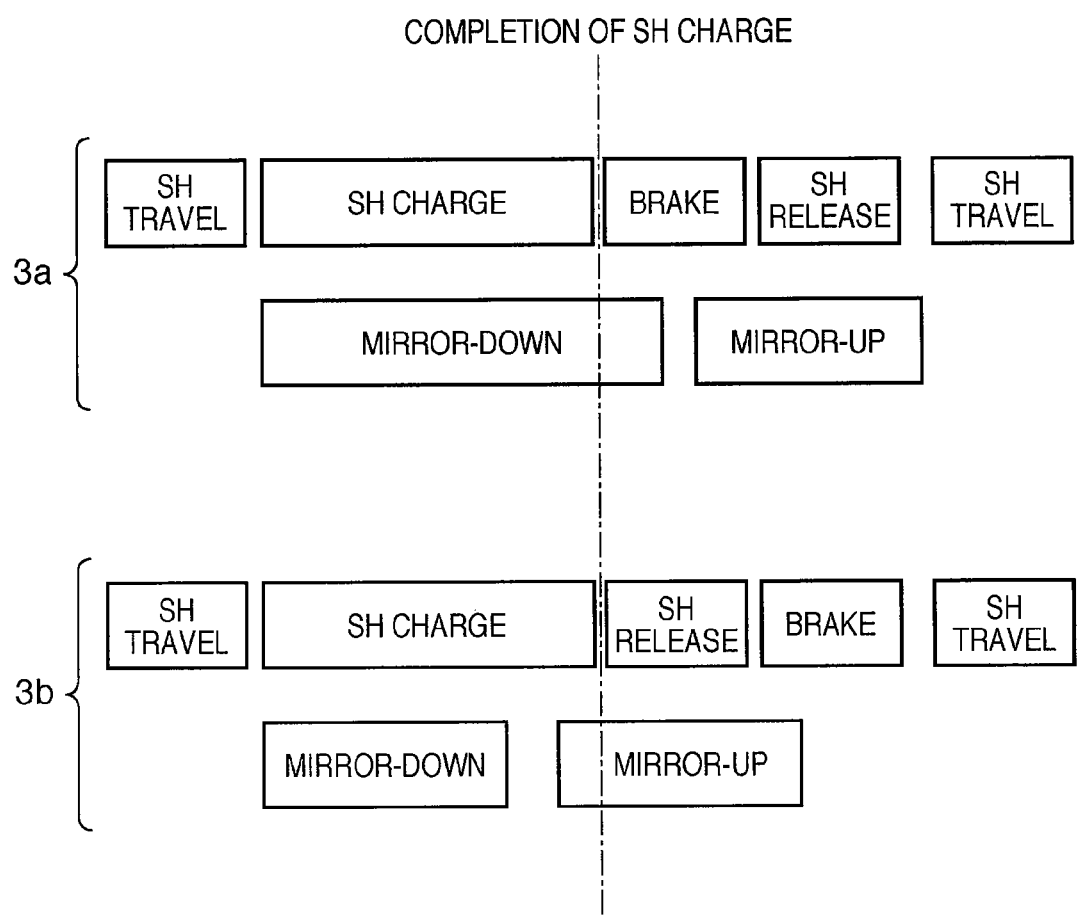
FIG. 3 shows charts showing an operation example of the image capturing apparatus according to the first embodiment of the present invention.

Shutter charge sequence switching processing according to the state of a mirror drive mechanism according to the first embodiment of the present invention will be described below using FIG. 3. FIG. 3 shows charts showing the operation timings of the shutter charge unit and mirror drive mechanism in the continuous shooting mode. The single shooting mode and continuous shooting mode can be switched by the mode dial 60.

In the continuous shooting mode, the operations of the mirror drive mechanism are performed parallel to those of the shutter charge unit. After completion of the exposure operation, the mirror-down drive operation is executed parallel to the charge operation of the shutter 12. At this time, at the completion timing of the charge operation of the shutter 12, the operation state of the mirror drive mechanism side is confirmed. When the mirror-down operation is complete, and the mirror-up operation is ready to be executed, the following drive operations are executed. As shown in the chart 3b in FIG. 3, the shutter drive motor 40b is driven at once to the shutter travel prepared state without executing brake processing of the shutter drive motor 40b (without latch the shutter drive motor 40b). Thus, the shutter charge unit can be shifted to the shutter travel prepared state within a short time period, thus improving the continuous shooting speed (the shooting speed in the continuous shooting mode).

On the other hand, when the mirror-down operation is not complete yet or the mirror-up operation is not ready to be executed at the completion timing of the charge operation of the shutter 12, the following drive operations are executed. As shown in the chart 3a in FIG. 3, the shutter drive motor 40b is braked to be stopped in the charge completed state (fixed state). After that, when the mirror-down operation is complete, and the mirror-up operation is ready to be executed, the shutter drive motor 40b is energized again. In this way, the shutter drive motor 40b is driven to the released state, that is, the shutter travel prepared state in which the latch unit holds the shutter leading blade drive lever 403 and shutter trailing blade drive lever 408.

The operations of the image capturing apparatus 1 including the detailed operations of the determination unit 50a and control unit 50b will be described below using the flowcharts in FIGS. 4 and 5.

Figure 4:
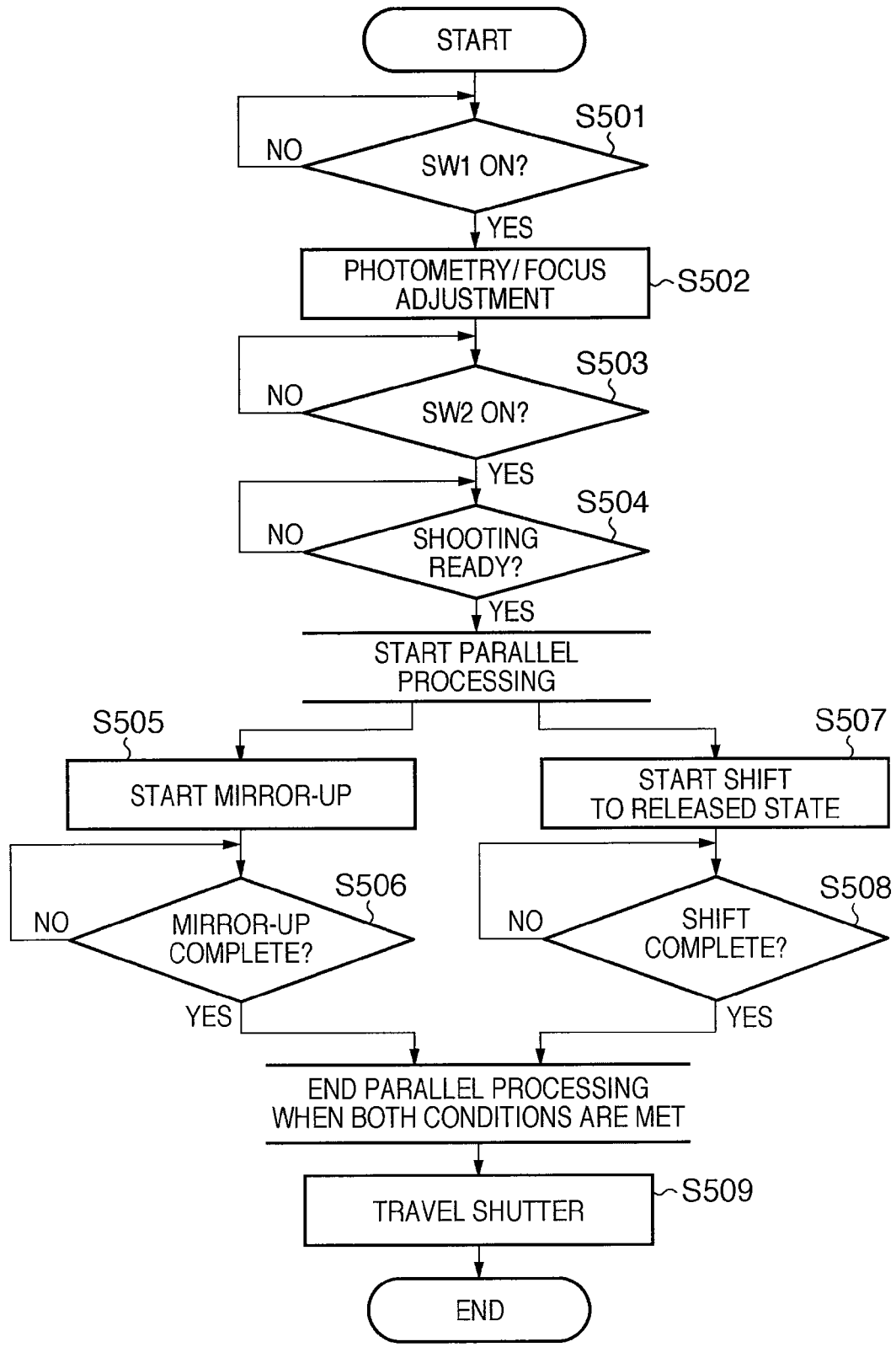
FIG. 4 is a flowchart showing an operation example of the image capturing apparatus according to the first embodiment of the present invention.

FIG. 4 is a flowchart showing the operations until completion of the exposure operation when the image capturing apparatus according to this embodiment accepts a shooting request.

If the first switch SW1 is not ON in step S501 (NO in step S501), the system control circuit 50 repeats step S501. If the system control circuit 50 detects that the first switch SW1 is ON (YES in step S501), it advances the process to step S502.

In step S502, the system control circuit 50 controls the focus detection unit 42 to execute focus detection processing and the photometry unit 46 to execute photometry processing, and receives their processing results. After the system control circuit 50 receives both the processing results of the focus detection processing and photometry processing, it advances the process to step S503.

If the second switch SW2 is not ON in step S503 (NO in step S503), the system control circuit 50 repeats step S503. If the system control circuit 50 detects that the second switch SW2 is ON (YES in step S503), it advances the process to step S504.

The system control circuit 50 determines in step S504 according to the focus detection processing result whether or not the lens 310 is in an in-focus state. Also, the system control circuit 50 determines whether or not the memory 30 and recording medium 200 have free spaces required for a shooting operation. The system control circuit 50 determines according to these determination results whether or not a shooting operation is ready to be executed. If the system control circuit 50 determines that the shooting operation is not ready to be executed (NO in step S504), it repeats step S504. If the system control circuit 50 determines that the shooting operation is ready to be executed (YES in step S504), it starts operations in steps S505 and S507 in parallel.

In step S505, the system control circuit 50 starts energization to the mirror drive motor 41a. The mirror drive motor 41a is energized to perform the mirror-up operation for retracting the mirror 130 of the image capturing apparatus to a position outside the shooting optical path.

The system control circuit 50 determines in step S506 whether or not the mirror drive motor has reached the mirror-up state and it is to be braked, that is, whether or not the mirror-up operation is complete. If the system control circuit 50 determines that the mirror-up operation is not complete yet (NO in step S506), it repeats step S506. If the system control circuit 50 determines that the mirror-up operation is complete (YES in step S506), it stops the mirror drive motor, and shifts the process to a waiting state required before it advances the process to step S509.

In step S507, the system control circuit 50 starts energization to the shutter drive motor 40b. The shutter drive motor

40b is energized to shift the shutter charge unit from the fixed state shown in FIG. 2A to the released state shown in FIG. 2B, that is, the travel prepared state.

The system control circuit 50 determines in step S508 whether or not the shutter charge unit has been driven to the shutter travel prepared state, and the shutter drive motor 40b is to be stopped. That is, the system control circuit 50 determines whether or not the shift processing of the shutter charge unit from the fixed state shown in FIG. 2A to the released state shown in FIG. 2B is complete. If the system control circuit 50 determines that the shift processing is not complete yet (NO in step S508), it repeats step S508. If the system control circuit 50 determines that the shift processing is complete (YES in step S508), it stops the shutter drive motor 40b, and shifts the process to the waiting state required before it advances the process to step S509.

If both a shift condition from step S506 to the waiting state and that from step S508 to the waiting state are met, the system control circuit 50 advances the process to step S509.

In step S509, the system control circuit 50 controls the shutter leading blade group 413 to travel by controlling the shutter leading blade latch drive member 406 to retract the shutter leading blade latch lever 405. After that, at a predetermined timing, the system control circuit 50 controls the shutter trailing blade group 414 to travel by controlling the shutter trailing blade latch drive member 412 to retract the shutter trailing blade latch lever 410. In this step, the system control circuit 50 controls the predetermined timing based on an exposure control value according to the photometry result in step S502.

Note that the shutter leading blade latch drive member 406 and shutter trailing blade latch drive member 412 charge capacitors included in the shutter 12 in advance. Upon traveling of the shutter leading blade group 413 or shutter trailing blade group 414, the latch unit is released by discharging the capacitors, thus controlling the shutter leading blade group 413 and shutter trailing blade group 414 to travel. Note that electromagnets used to hold the shutter leading blade group 413 and shutter trailing blade group 414 may be energized in advance. Then, upon traveling of the shutter leading blade group 413 or shutter trailing blade group 414, energization to the corresponding electromagnets may be cut off to remove attracting forces, thereby controlling the shutter leading blade group 413 and shutter trailing blade group 414 to travel.

Figure 5:
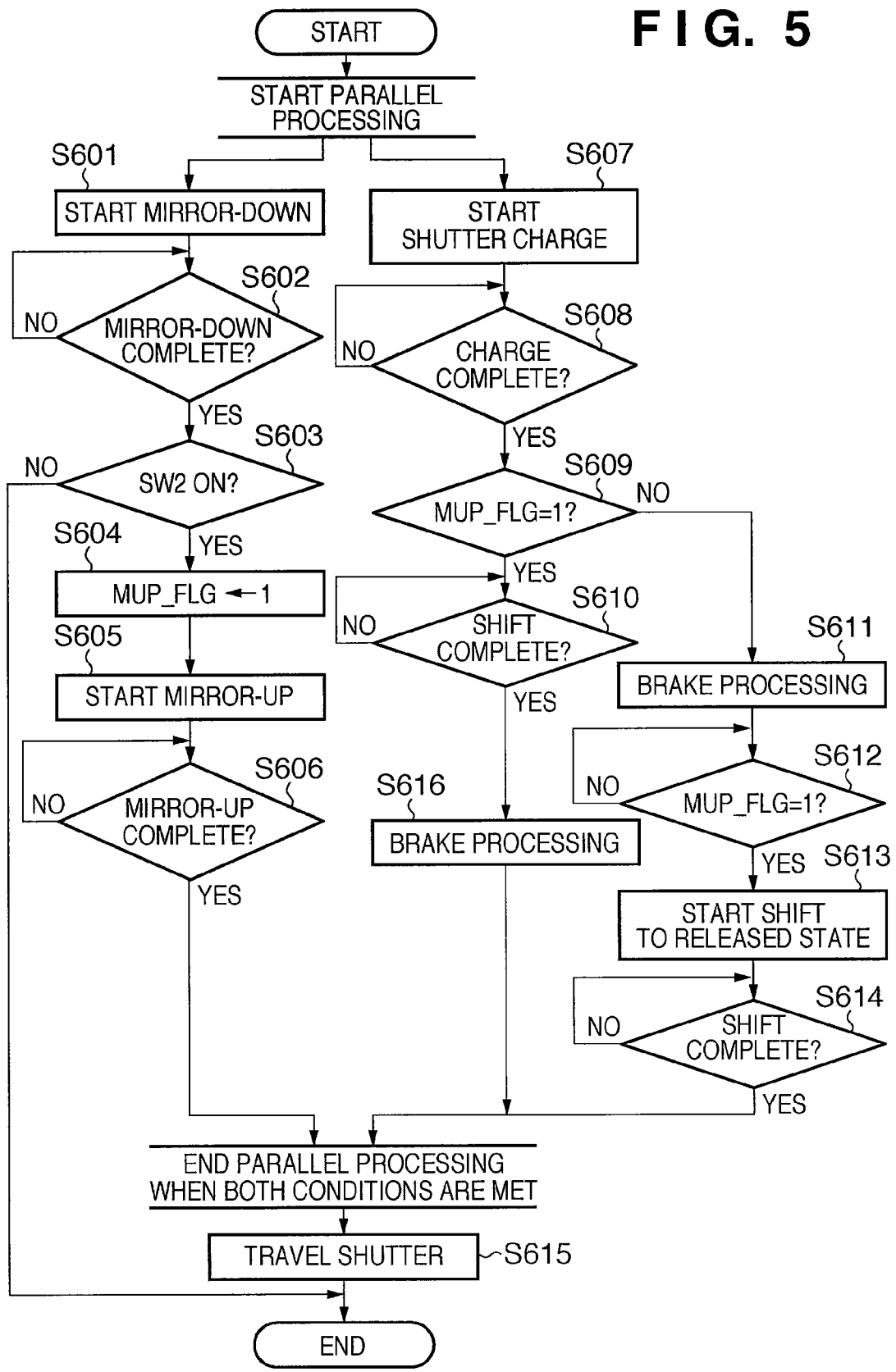
FIG. 5 is a flowchart showing an operation example of the image capturing apparatus according to the first embodiment of the present invention.

FIG. 5 is a flowchart showing the operations after the image capturing apparatus according to this embodiment accepts a shooting request, and completes exposure processing.

The system control circuit 50 parallelly starts operations in steps S601 and S607 upon reception of an operation instruction in the continuous shooting mode from the input unit 80.

In step S601, the system control circuit 50 energizes the mirror drive motor 41a to start the mirror-down operation.

The system control circuit 50 determines in step S602 whether or not the mirror drive mechanism has reached a mirror-down completed position, and the motor is to be braked, that is, the mirror-down operation is complete. If the system control circuit 50 determines that the mirror-down operation is not complete yet (NO in step S602), it repeats step S602. If the system control circuit 50 determines that the mirror-down operation is complete (YES in step S602), it stops energization to the mirror drive motor 41a and advances the process to step S603. Then, in step S609, the determination unit 50a of the system control circuit 50 determines as follows. The determination unit 50a confirms completion of the mirror-down operation by the mirror drive motor 41a and determines that a switching ready state by the mirror drive motor 41a from the mirror-down state to the mirror-up state is set.

In step S603, the system control circuit 50 detects the state of the second switch SW2. If the second switch SW2 is OFF (NO in step S603), the system control circuit 50 determines that a shooting end instruction is received, and ends the continuous shooting operation. If the shutter switch SW2 (switch 64) is ON (YES in step S603), the system control circuit 50 advances the process to step S604.

In step S604, the system control circuit 50 sets a value indicating the switching ready state from the mirror-down state to the mirror-up state (for example, 1) in a mirror-up start flag MUP_FLG.

In step S605, the system control circuit 50 starts energization to the mirror drive motor 41a. Then, the mirror drive mechanism starts the mirror-up operation.

The system control circuit 50 determines in step S606 whether or not the mirror drive motor has reached the mirror-up state and is to be braked, that is, the mirror-up operation is complete. If the system control circuit 50 determines that the mirror-up operation is not complete yet (NO in step S606), it repeats step S606. If the system control circuit 50 determines that the mirror-up operation is complete (YES in step S606), it stops the mirror drive motor 41a, and shifts the process to a waiting state required before it advances the process to step S615.

In step S607, the system control circuit 50 energizes the shutter drive motor 40b to start an operation for charging the shutter 12.

The system control circuit 50 determines in step S608 whether or not the shutter charge unit has been driven to a motor brake position required to surely stop the shutter charge unit at a shutter charge completed position, that is, whether or not the charge operation of the shutter 12 is complete. More specifically, the system control circuit 50 determines the brake position by detecting the rotation angle of the cam gear 401. For example, the system control circuit 50 brakes the shutter drive motor 41b 10° before the shutter charge lever 402 is lifted to the cam top position of the cam gear 401. As for the brake start timing as an angle (°) before the cam top position, an appropriate angle may be calculated based on a power supply voltage, environmental temperature, shutter drive count, and the like.

If the system control circuit 50 determines that the charge operation of the shutter 12 is not complete yet (NO in step S608), it repeats step S608. If the system control circuit 50 determines that the charge operation of the shutter 12 is complete (YES in step S608), it advances the process to step S609.

The determination unit 50a of the system control circuit 50 determines in step S609 confirms the mirror-up start flag MUP_FLG to determine whether or not the switching ready state by the mirror drive motor 41a from the mirror-down state to the mirror-up state is set. More specifically, if "1" is set in the mirror-up start flag MUP_FLG, that is, if the mirror-up operation is permitted (YES in step S609), the determination unit 50a advances the process to step S610. If "1" is not set in the mirror-up start flag MUP_FLG, that is, if the mirror-up operation is not permitted (NO in step S609), the determination unit 50a advances the process to step S611.

In step S610, the control unit 50b of the system control circuit 50 controls the shutter drive motor 41b as follows. The control unit 50b controls the shutter drive motor 41b to execute switching processing from the fixed state (see FIG. 2A) to the released state (see FIG. 2B) without latch the shutter drive motor 41b. That is, the control unit 50b continuously executes a shutter travel preparation operation without latch the shutter drive motor 41b at the shutter charge completed position. The system control circuit 50 determines whether or not the shutter charge unit has been driven to the shutter travel prepared position, and the motor is to be stopped, that is, whether or not the shift operation of the shutter charge unit from the fixed state to the released state is complete. If the system control circuit 50 determines that the shift operation is not complete yet (NO in step S610), it repeats step S610. If the system control circuit 50 determines that the shift operation is complete (YES in step S610), it advances the process to step S616.

In step S616, the control unit 50b of the system control circuit 50 executes brake processing for latch the shutter drive motor 41b. That is, the control unit 50b brakes the shutter drive motor 41b to stop it in the released state (see FIG. 2B). After the control unit 50b stops the shutter drive motor 41b, it shifts the process to the waiting state required before it advances the process to step S615.

In step S611, the control unit 50b of the system control circuit 50 executes brake processing for latch the shutter drive motor 41b. That is, the control unit 50b brakes the shutter drive motor 41b to stop it in the charge completed state (the fixed state shown in FIG. 2A). After the control unit 50b stops the shutter drive motor 41b, it advances the process to step S612.

In step S612, the determination unit 50a of the system control circuit 50 confirms the mirror-up start flag MUP_FLG to determine whether or not the switching ready state by the mirror drive motor 41a from the mirror-down state to the mirror-up state is set. The control unit 50b of the system control circuit 50 confirms the mirror-up start flag MUP_FLG, and waits until "1" is set in the mirror-up start flag MUP_FLG, that is, the mirror-up operation is permitted. That is, if "1" is not set in the mirror-up start flag MUP_FLG, that is, if the mirror-up operation is not permitted (NO in step S612), the control unit 50b repeats step S612. If "1" is set in the mirror-up start flag MUP_FLG, that is, if the mirror-up operation is permitted (YES in step S612), the control unit 50b advances the process to step S613.

In step S613, the control unit 50b of the system control circuit 50 controls the shutter drive motor 41b as follows. The control unit 50b controls the shutter drive motor 41b to operate again and to switch from the fixed state (see FIG. 2A) to the released state (see FIG. 2B). That is, the control unit 50b starts energization to the shutter drive motor 41b. The shutter drive motor 41b is energized to shift the shutter charge unit from the fixed state to the released state, that is, the travel prepared state.

The system control circuit 50 determines in step S614 whether or not the shutter charge unit has been driven to the shutter travel prepared state, and the shutter drive motor 41b is to be stopped. That is, the system control circuit 50 determines whether or not the shift operation of the shutter charge unit from the fixed state to the released state is complete. If the system control circuit 50 determines that the shift operation is not complete (NO in step S614), it repeats step S614. If the system control circuit 50 determines that the shift operation is complete (YES in step S614), it stops the shutter drive motor 41b, and shifts the process to the waiting state required before it advances the process to step S615.

If both a shift condition from step S606 to the waiting state and that from step S614 to the waiting state are met, the system control circuit 50 advances the process to step S615.

In step S615, the system control circuit 50 controls the shutter leading blade group 413 to travel by controlling the shutter leading blade latch drive member 406 to retract the shutter leading blade latch lever 405. After that, at a predetermined timing, the system control circuit 50 controls the shutter trailing blade group 414 to travel by controlling the shutter trailing blade latch drive member 412 to retract the shutter trailing blade latch lever 410. In this step, the system control circuit 50 controls the predetermined timing based on an exposure control value according to the photometry result in step S502.

As described above, according to this embodiment, whether or not to continuously execute the shutter charge operation and the shutter travel preparation operation is switched depending on whether or not the operation of the mirror drive mechanism is slower than the operation of the shutter charge unit. Thus, when the operation speed of the mirror drive mechanism is sufficiently high, the continuous shooting speed is increased; otherwise, the shutter charge unit is stopped at a safe position where the shutter is prevented from inadvertently traveling. As a result, the shooting end instruction from the user in the continuous shooting mode can be coped with a good response, and the shooting speed in the continuous shooting mode can be improved without repeating a fruitless shutter charge operation.

Second Embodiment

The operation of an image capturing apparatus 1 according to the second embodiment of the present invention will be described below using the flowchart shown in FIG. 6. Differences from the first embodiment will be mainly described below.

Figure 6:
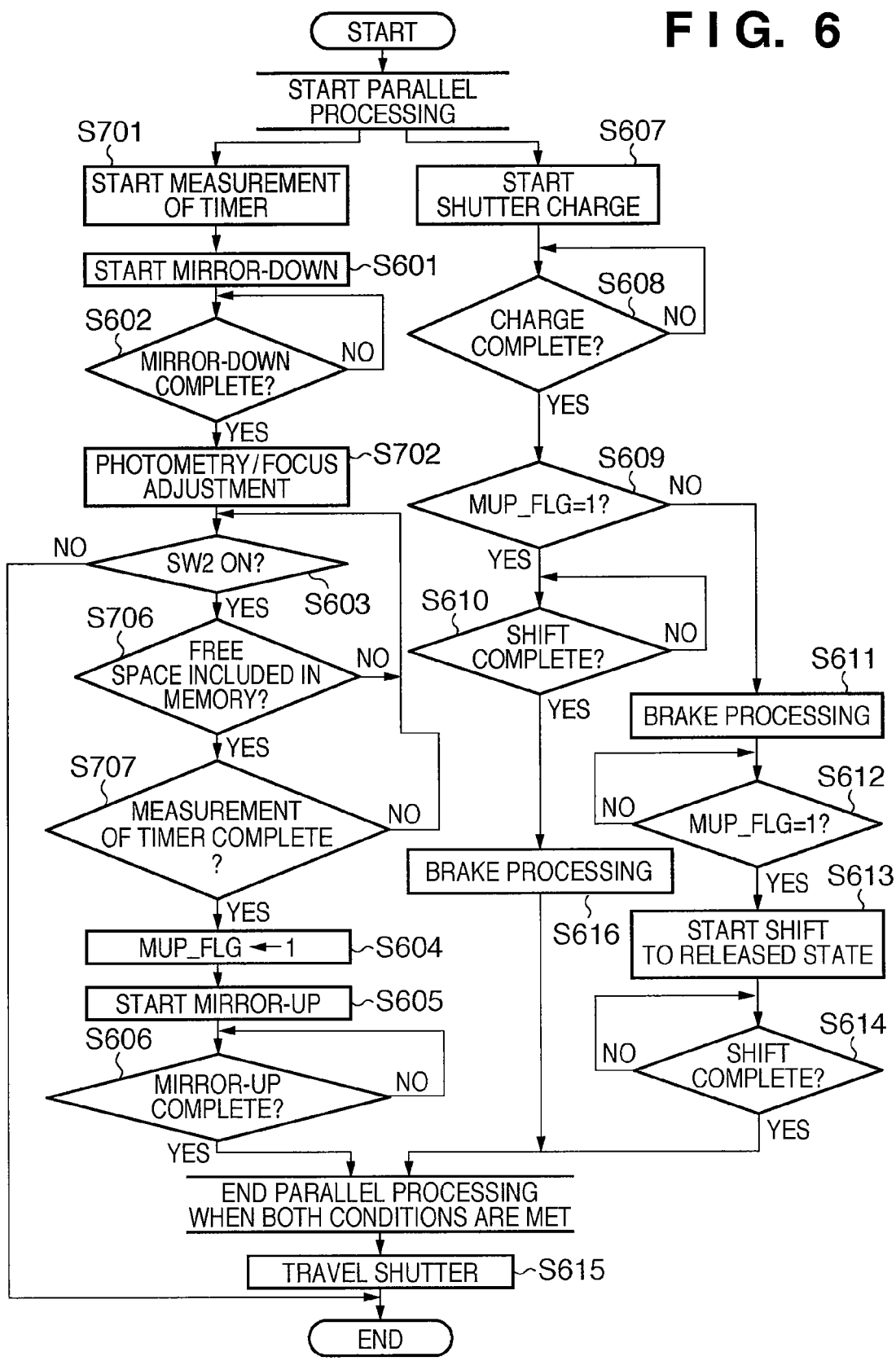
FIG. 6 is a flowchart showing an operation example of an image capturing apparatus according to the second embodiment of the present invention.

FIG. 6 is a flowchart showing operations after the image capturing apparatus according to this embodiment accepts a shooting request, and completes exposure processing.

A system control circuit 50 parallelly starts operations in steps S701 and S607 upon reception of an operation instruction in a continuous shooting mode from an input unit 80.

In step S701, the system control circuit 50 controls a timer to measure a time required to stabilize a shooting speed of the continuous shooting mode. The timer specifies mirror-up start timings during continuous shooting operations, and is used to absorb fluctuations of times required for mirror-down operations and those required for photometry and focus detection times between frames in the continuous shooting operations. After that, the system control circuit 50 advances the process to step S601.

In step S702, the system control circuit 50 controls a focus detection unit 42 to execute focus detection processing and a photometry unit 46 to execute photometry processing, and receives their processing results. After the system control circuit 50 receives both the processing results of the focus detection processing and photometry processing, it advances the process to step S603. Thus, in step S609, a determination unit 50a confirms completion of the photometry processing and focus detection processing in a mirror-down state, and determines that a switching ready state by a mirror drive motor from the mirror-down state to a mirror-up state is set.

The system control circuit 50 determines in step S706 whether or not a memory 30 and recording medium 200 have free spaces required for a shooting operation, that is, whether or not a free space required for a shooting operation is assured in an image memory. If the system control circuit 50 determines that the required free space is not assured in the image memory (NO in step S706), it advances the process to step S603. If the system control circuit 50 determines that the required free space is assured in the image memory (YES in step S706), it advances the process to step S707. Thus, in step S609, the determination unit 50a of the system control circuit 50 confirms that the free space required for the shooting operation is assured in the image memory, and determines that the switching ready state by the mirror drive motor 41a from the mirror-down state to the mirror-up state is set.

The system control circuit 50 determines in step S707 whether or not the timer has reached a time-out. That is, the system control circuit 50 determines whether or not a time, which is set in advance, has elapsed after a mirror 130 started a switching operation from the mirror-up state to the mirror-down state. If the system control circuit 50 determines that the timer has not reached a time-out yet (NO in step S707), it advances the process to step S703. If the system control circuit 50 determines that the timer has reached a time-out (YES in step S707), it advances the process to step S604. Thus, in step S609, the determination unit 50a of the system control circuit 50 determines as follows. The determination unit 50a confirms that the measurement of the time required to stabilize the shooting speed of the continuous shooting operations is complete, and determines that the switching ready state by the mirror drive motor 41a from the mirror-down state to the mirror-up state is set.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-197238, filed on Aug. 27, 2009, which is hereby incorporated by reference herein its entirety.

What is claimed is:

1. An image capturing apparatus comprising:
a shutter drive member which drives shutter blades;
a shutter spring which urges said shutter drive member;
a shutter charge unit adapted to charge said shutter spring, said shutter charge unit being switched between a fixed state in which a charge operation of said shutter spring is completed and said shutter drive member is fixed, and a released state in which the fixed state is released;
a drive unit adapted to drive said shutter charge unit;
a first determination unit adapted to determine whether or not the charge operation of said shutter spring is completed by driving of said shutter charge unit with said drive unit;
a holding unit adapted to, when said shutter charge unit is switched to the released state, hold said shutter drive member with said shutter spring being charged;
a mirror switched between a mirror-down state inserted in a shooting optical path and a mirror-up state retracted from the shooting optical path;
a second determination unit adapted to determine whether or not said mirror is in a switching ready state in which said mirror can be switched from the mirror-down state to the mirror-up state; and
a control unit adapted to, if said second determination unit determines that said mirror is in the switching ready state when said first determination unit determines that the charge operation of said shutter spring is completed, control said drive unit to drive said shutter charge unit to the released state without stopping said shutter charge unit in the fixed state.

2. The apparatus according to claim 1, wherein if said second determination unit does not determine that said mirror is in the switching ready state when said first determination unit determines that the charge operation of said shutter spring is completed, said control unit controls said drive unit to stop said shutter charge unit in the fixed state, and to drive said shutter charge unit from the fixed state to the released state after said second determination unit determines that said mirror is in the switching ready state.

3. The apparatus according to claim 1, further comprising:
a mirror drive motor for driving said mirror between the mirror-down state and the mirror-up state,
wherein said second determination unit determines that said mirror is in the switching ready state by determining whether or not a drive operation of said mirror by said mirror drive motor is completed.

4. The apparatus according to claim 1, further comprising:
a focus detection unit which is capable of executing focus detection processing when said mirror is switched to the mirror-down state,
wherein said second determination unit determines that said mirror is in the switching ready state by determining whether or not the focus detection processing in the mirror-down state is completed.

5. The apparatus according to claim 1, further comprising:
a photometry unit which is capable of executing focus detection processing when said mirror is switched to the mirror-down state,
wherein said second determination unit determines that said mirror is in the switching ready state by determining whether or not the photometry processing in the mirror-down state is completed.

6. The apparatus according to claim 1, wherein said second determination unit determines that said mirror is in the switching ready state by determining whether or not a time, which is set in advance, has elapsed after said mirror started a switching operation from the mirror-up state to the mirror-down state.

7. The apparatus according to claim 1, wherein said second determination unit determines that said mirror is in the switching ready state by determining whether or not a free space required for a shooting operation is assured in an image memory.

8. An image capturing apparatus comprising:
a shutter drive member which drives shutter blades;
a shutter spring which urges said shutter drive member;
a shutter charge unit adapted to charge said shutter spring, said shutter charge unit being switched between a fixed state in which a charge operation of said shutter spring is completed and said shutter drive member is fixed, and a released state in which the fixed state is released;
a drive unit adapted to drive said shutter charge unit;
a first determination unit adapted to determine whether or not the charge operation of said shutter spring is completed by driving of said shutter charge unit with said drive unit;

a holding unit adapted to, when said shutter charge unit is switched to the released state, hold said shutter drive member with said shutter spring being charged;

a mirror switched between a mirror-down state inserted in a shooting optical path and a mirror-up state retracted from the shooting optical path;

a second determination unit adapted to determine whether or not said mirror is switched to the mirror-down state; and a control unit adapted to, if said second determination unit determines that said mirror is switched to the mirror-down state when said first determination unit determines that the charge operation of said shutter spring is completed, control said drive unit to drive said shutter charge unit to the released state without stopping said shutter charge unit in the fixed state.

9. The apparatus according to claim 8, wherein if said second determination unit does not determine that said mirror is switched to the mirror-down state when said first determination unit determines that the charge operation of said shutter spring is completed, said control unit controls said drive unit to stop said shutter charge unit in the fixed state, and to drive said shutter charge unit from the fixed state to the released state after said second determination unit determines that said mirror is switched to the mirror-down state.

10. The apparatus according to claim 8, further comprising:

a mirror drive motor for driving said mirror between the mirror-down state and the mirror-up state, wherein said second determination unit determines that said mirror is switched to the mirror-down state by determining whether or not a drive operation of said mirror by said mirror drive motor is completed.

11. The apparatus according to claim 8, further comprising:

a focus detection unit which is capable of executing focus detection processing when said mirror is in the mirror-down state, wherein said second determination unit determines that said mirror is switched to the mirror-down state by determining whether or not the focus detection processing is completed.

12. The apparatus according to claim 8, further comprising:

a photometry unit which is capable of executing focus detection processing when said mirror is in the mirror-down state, wherein said second determination unit determines that said mirror is switched to the mirror-down state by determining whether or not the photometry processing is completed.

13. The apparatus according to claim 8, wherein said second determination unit determines that said mirror is switched to the mirror-down state by determining whether or not a time, which is set in advance, has elapsed after said mirror started a switching operation from the mirror-up state to the mirror-down state.

14. The apparatus according to claim 8, wherein said second determination unit determines that said mirror is switched to the mirror-down state by determining whether or not a free space required for a shooting operation is assured in an image memory.

* * * * *